Figure 1:
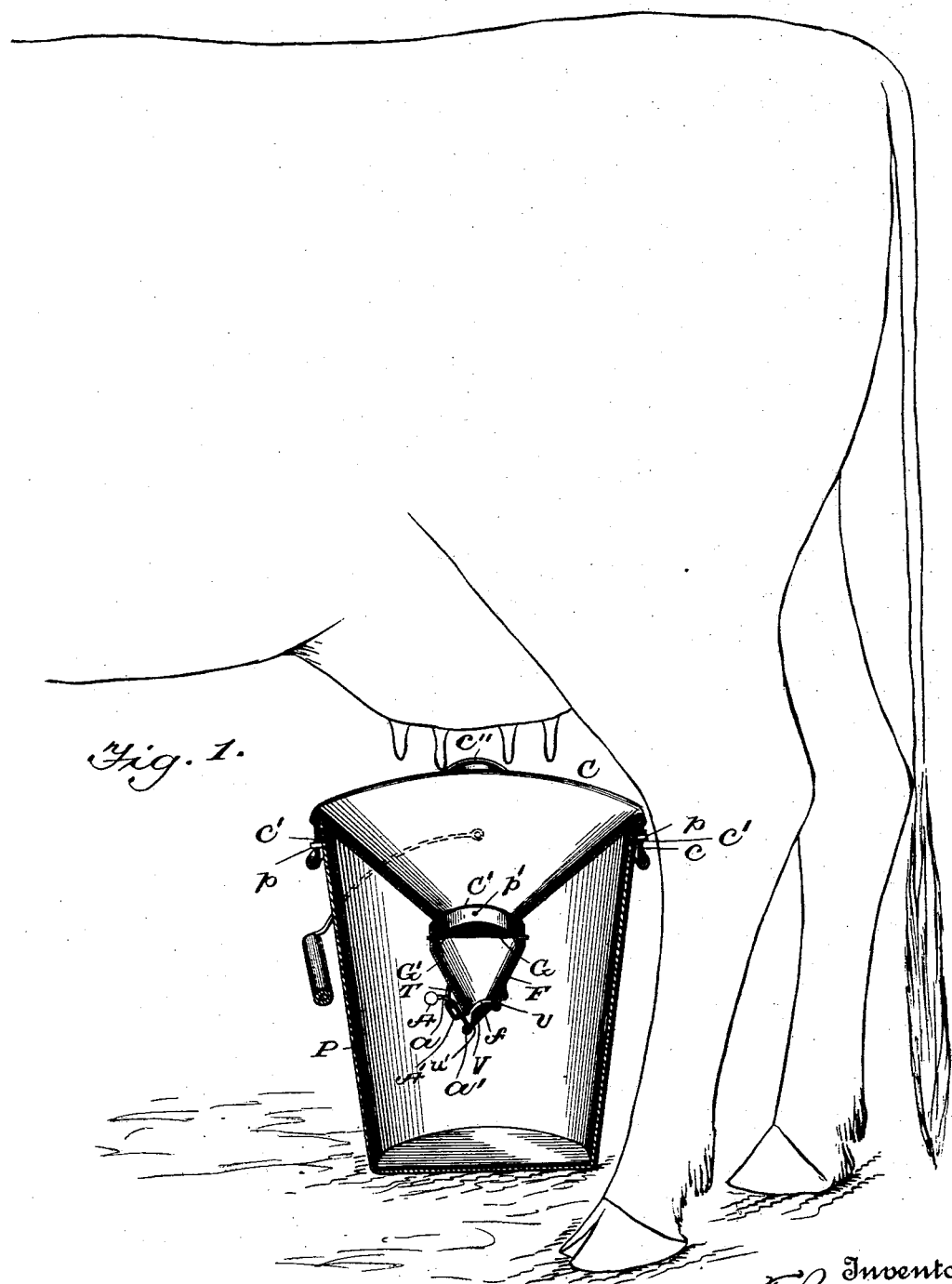

(No Model.) 2 Sheets—Sheet 1.

W. F. BOSSINGER.
MILK PAIL.

No. 586,377. Patented July 13, 1897.

Witnesses:

Inventor
William F. Bossinger,
by Collamer & Co.,
Attorneys.

THE NORRIS PETERS CO., PHOTO-LITHO., WASHINGTON, D. C.

(No Model.) 2 Sheets—Sheet 2.
W. F. BOSSINGER.
MILK PAIL.
No. 586,377. Patented July 13, 1897.
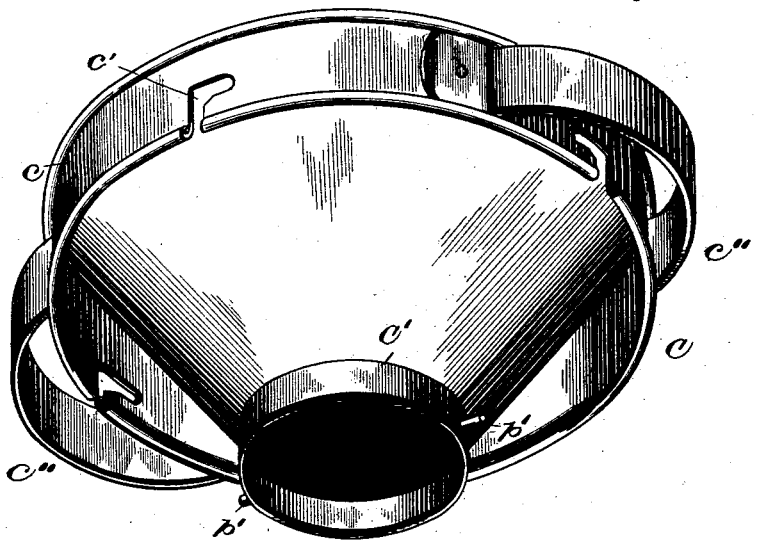
Fig. 2.
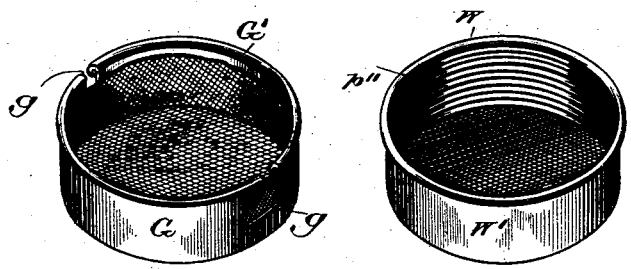
Fig. 3.
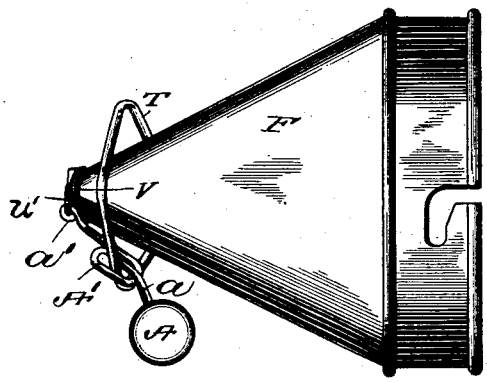
Witnesses:
John Smile
J. H. Jochum Jr.
Inventor:
William F. Bossinger,
by Collamer & Co.,
Attorneys.

UNITED STATES PATENT OFFICE.

WILLIAM FREDRICH BOSSINGER, OF LEWISTOWN, PENNSYLVANIA.

MILK-PAIL.

SPECIFICATION forming part of Letters Patent No. 586,377, dated July 13, 1897.

Application filed September 24, 1896. Serial No. 606,820. (No model.)

*To all whom it may concern:*

Be it known that I, WILLIAM FREDRICH BOSSINGER, a citizen of the United States, and a resident of Lewistown, Mifflin county, State of Pennsylvania, have invented certain new and useful Improvements in Milk-Pail Covers and Strainers, and my preferred manner of carrying out the invention is set forth in the following full, clear, and exact description, terminating with claims particularly specifying the novelty.

This invention relates to devices for use in the dairy, and more especially to pails and strainers; and the object of the same is to produce an improved milk-pail cover that will permit the entrance of milk into the pail, but prevent its being spilled in case the pail should be accidentally tipped over.

To this end the invention consists in providing at the lower end of a funnel-shaped cover fitting tightly but removably upon a milk-pail a valve of peculiar construction which will close automatically when the funnel is moved out of a vertical position, as by accident, but will open automatically when the funnel is again set upright, and thus admit the milk to the body of the pail.

The invention also consists in certain other details of construction, all as set forth below and as illustrated in the accompanying drawings, wherein—

Figure 1 is a large view showing the complete pail and all its parts in section as they appear in use. Fig. 2 is a perspective view of the under side of the cover and the upper sides of the two strainers, the wire strainer illustrating a modified form of connection. Fig. 3 is a side elevation of the funnel in detail, turned to a position on one side and with the valve closed.

It is well known to dairymen, farmers, and others who do much milking that the milk-pail often becomes overturned, generally by reason of a kick from an unruly cow, and the result is the loss of all the milk that may have accumulated in the pail. Various contrivances have been invented for preventing such overturning by holding the pail fast, holding the animal's feet and tail, and even by providing the pail with an automatically-closing valve that prevents the egress of the milk when the pail stands otherwise than upright.

All devices of the latter class, so far as I am aware, possess certain imperfections or objectionable qualities, and the present invention is designed to present a device wherein all these objections shall be overcome.

Referring to the drawings by letter, P is the usual pail, which may have a bail, as shown, and which preferably has pins $p$ projecting radially from its mouth to form part of a bayonet-joint with the cover described below, although this could be a screw-joint, if preferred, or any other approved form of connection, so long as it was water-tight.

C designates the cover, made slightly funnel-shaped and terminating at its lower central portion in a short downwardly-projecting collar C', surrounding the outlet of said funnel. Around its upper end this cover has a depending flange $c$ of a size to fit over the upper end of the pail-body so tightly as to effect the water-tight connection above mentioned, and in this flange are cut bayonet-slots $c'$, as shown, (or formed interior threads, if the joint is a screw,) while there may be exterior handles $c''$ on the flange, if desired, and by which it can be removed from the pail.

G is the gauze strainer, consisting of a body of fine gauze or other suitable fabric, which is laid over a ring G', of metal, the upper edge of such ring having bayonet-slots $g$, adapted to connect with the pins $p'$, that are shown in Fig. 2 as projecting radially from the collar C' and which of course puncture the cloth.

W is the wire strainer, consisting of fine wire attached to the lower edge of a metal ring W', which is of the same size as the ring G'. This ring W' is shown as interiorly threaded, as at $p''$, whereby it could be screwed onto the collar C' if the latter were exteriorly threaded instead of having the pins shown, and it will be obvious that either form of connection could be used, but the same must exist on both or all the strainers employed.

The letter F designates the funnel, whose mouth at the upper end has a collar of just sufficient size to fit over either ring and is connected therewith by bayonet, screw, or other form of joint. The body of this funnel tapers to a small bias outlet $f$ at its lower extremity, and hinged, as at $v$, at the higher side of such outlet is a valve V, adapted to close upwardly tightly against the orifice, while the lower edge of the valve has an eye $u'$, as shown.

T is a stout piece of wire secured at its extremities to opposite sides of the funnel, extending thence slightly outward and having its center depressed at a point above said eye $u'$, and this wire forms a track for the weight A, which latter is in turn supported by a stiff wire $a$, having a loop A′ in its body and an eye $a'$ at its lower end linked loosely into the eye $u'$ of the valve. The action of the weight is automatic in either direction, (opening or closing the valve as the loop runs onto the lower center or higher ends of the track, respectively;) but if the valve should not open by reason of its sticking the weight of the milk within the funnel would soon assist sufficiently to overcome such resistance.

Such being the construction of parts they are assembled as seen in Fig. 1, and the operation is as follows: The dairyman commences his milking, and the milk falling upon the cover C is deflected through its collar C′, whence it passes through either strainer that may be employed, (or through none at all, if omitted,) and flows thence into and through the funnel F, its weight opening the valve V if the latter should not operate automatically under the force of the weight employed for that purpose. Supposing a quart of milk to have accumulated within the pail and the cow being milked gives a vigorous kick which upsets the pail, all parts immediately assume a horizontal position approximately, and the funnel F is thrown into the position seen in Fig. 3. The weight A falls, carrying the upper end of wire $a$ with it, the loop A′ slides along the track T from its lower central point to one of its higher ends, the linked eyes $a'$ and $u'$ are drawn upward toward the track, and the valve V is closed against the outlet $f$ at the lower end of the funnel F, so that no milk can escape, all joints being water-tight. Indeed, the fact that the funnel hangs so low within the body of the pail will allow a considerable quantity of milk to stand within the latter against the side of such funnel and the lower side of the cover without necessarily passing out the orifice $f$ at all, even if the valve did not close it; but the operation of this valve at the proper moment will prevent any egress of milk no matter how nearly full the pail may have been when the accident occurred. The operator immediately rights the pail, when the valve automatically opens again, and he resumes his labor without loss.

All parts of this device are of the desired sizes, shapes, proportions, and materials, though preferably of block-tin, and such changes in and additions to the details of construction may be made as come within the spirit of my invention.

What is claimed as new is—

1. The combination with a milk-pail, and a funnel-shaped cover therefor; of a funnel detachably connected with the center of said cover and communicating therewith, a valve hinged at one side of the opening at the lower end of the funnel and having an eye at its opposite edge, a track having a depressed center and higher ends secured to opposite sides of the exterior of the funnel, and a weight traveling on said track and connected with said eye, as and for the purpose set forth.

2. The combination with a milk-pail, a funnel therein having a bias outlet-opening at its lower end, and detachable water-tight connections between the upper ends of the pail and funnel; of a valve hinged to the funnel at the higher side of its outlet and having an eye at its opposite edge, a track having a depressed center and higher ends which latter are turned inward and secured to opposite sides of the funnel on the exterior of its body, a stiff wire linked into said eye and having an eye in its body loosely embracing the track, and a weight mounted on the upper end of this wire, as and for the purpose set forth.

In testimony whereof I have hereunto subscribed my signature on this the 22d day of September, A. D. 1896.

WILLIAM FREDRICH BOSSINGER.

Witnesses:
J. F. SWEENY,
RICHARD SHATSE.